United States Patent
Acharya et al.

(10) Patent No.: US 8,189,464 B2
(45) Date of Patent: May 29, 2012

(54) SECONDARY STORAGE TO REDUCE COUNTER MEMORY IN FLOW TABLES

(75) Inventors: Dipankar Bhatt Acharya, Saratoga, CA (US); Joanne Ottney, Los Gatos, CA (US)

(73) Assignee: Cisco Technology Inc., San Jose, CA (US)

( * ) Notice: Subject to any disclaimer, the term of this patent is extended or adjusted under 35 U.S.C. 154(b) by 391 days.

(21) Appl. No.: 12/614,363

(22) Filed: Nov. 6, 2009

(65) Prior Publication Data

US 2011/0113190 A1     May 12, 2011

(51) Int. Cl.
*H04J 3/14* (2006.01)
(52) U.S. Cl. ......................................................... 370/229
(58) Field of Classification Search ........................ None
See application file for complete search history.

(56) References Cited

U.S. PATENT DOCUMENTS

| | | | |
|---|---|---|---|
| 6,603,765 B1 | 8/2003 | Wilford | |
| 7,304,942 B1 | 12/2007 | Malladi | |
| 2002/0122422 A1* | 9/2002 | Kenney et al. | 370/392 |
| 2007/0109968 A1* | 5/2007 | Hussain et al. | 370/232 |
| 2007/0115974 A1* | 5/2007 | Messenger | 370/389 |
| 2007/0183421 A1* | 8/2007 | Terrell et al. | 370/389 |
| 2008/0123528 A1* | 5/2008 | Wyatt | 370/232 |

* cited by examiner

*Primary Examiner* — Jianye Wu
(74) *Attorney, Agent, or Firm* — Charles E. Krueger (57) ABSTRACT

In one embodiment, a CAM overflow structure holds flow indices in a CAM and each CAM entry is associated with an overflow count value (OCV) entry holding an OCV. If counter in a primary flow-counter bank (PFCB) overflows when updated, the CAM is searched and, if the index of the counter that overflowed is stored in the associated OCV entry, the OCV is incremented. The counter values in the PFCB are scanned according to specified criteria and transferred to a secondary flow-counter bank (SFCB) held in non-custom system RAM. When a counter value is transferred to the SFCB the corresponding OCV is appended to the counter value.

20 Claims, 9 Drawing Sheets

SECONDARY STORAGE TO REDUCE COUNTER MEMORY IN FLOW TABLES

TECHNICAL FIELD

The present disclosure relates generally to communications and computer systems, and more particularly, relates to maintaining counters and updating a secondary counter storage based on values of the counters and entries in an overflow structure.

BACKGROUND OF THE INVENTION

In networking devices it is important to maintain accurate packet and byte counters for all traffic flowing through the devices. Such counters are important for customers, for lab testing, and also for verification and debugging purposes. Generally, counters must be maintained for a large number of items in a few different categories (e.g., individual routes the packets are taking, the adjacencies/next hops of the packets, etc.). It is not unusual for a network device to need to maintain counters on packets arriving at a rate of fifty million packets per second, and to have to support one million routes (i.e., one million different sets of packet and byte counters in the route category). Many communications and computer systems keep large numbers of counters to indicate that certain events have occurred. Examples of such events include packets forwarded, bytes forwarded, overrate bytes and underrate bytes. Externally-visible counters (i.e., those available to the system, which are typically accumulated values from the counter bank counters maintained inside components) typically must maintain total event counts that last for days, weeks, or even years.

In implementations with counters implemented on an application-specific integrated circuit (ASIC), it is not uncommon for the counter state to total many megabits of on-chip or custom off-chip memory occupying a non-trivial fraction of the total chip area. For example, one packet switch uses roughly 150,000 on-chip packet and byte counters with each counter having thirty-two bits of on-chip storage totaling 4.8 megabits of on-chip storage. Therefore, it is valuable if the on-chip storage required can be reduced while still ensuring that counters presented to the user do not wrap, and while not increasing CPU burden or bus bandwidth utilization required to read them periodically. An issue in maintaining these counters is providing the necessary combination of storage space and bandwidth in a fashion that is cost effective, low in power, and low in pin count. Complicating the bandwidth issue is that as the number of counters grows the frequency at which software can reasonably read an individual counter lessens. The size and number of counters make storing the full counters directly on a packet switching chip expensive with today's technologies.

DESCRIPTION OF EXAMPLE EMBODIMENTS

Overview

In an example embodiment a current value of a counter held in a first entry of a primary flow-counter bank (PFCB) is updated when a packet in a first netflow is received, with the first entry indexed by a first index hashed from tuples in packets of the first netflow, with the PFCB maintained on a netflow processing logic block, with each entry in the PFCB associated with a netflow, with each entry in the PFCB having an index hashed from tuples in packets of an associated flow, and with each entry in the PFCB holding information identifying the associated netflow.

A content addressable memory (CAM) is searched when the current value overflows, with CAM entries holding a set of valid indices, to determine if the first index is included in the set of valid indices, where each CAM entry is associated with an overflow count value (OCV) entry in a custom memory that holds an OCV.

A first OCV is incremented by an incremental value if the first index is a valid index held in a first CAM entry, where the first OCV is held in a first OCV entry associated with the first CAM entry holding the first index.

The first OCV and the current value are consolidated to form a total count value when the current value of the first counter is to be transferred to secondary storage and the total count value is transferred to an entry in secondary storage corresponding to the first netflow.

DESCRIPTION

Reference will now be made in detail to various example embodiments. These example embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the example embodiments may be practiced without some or all of these specific details. In other instances, well known process operations have not been described in detail in order not to unnecessarily obscure the present invention. Further, each appearance of the phrase "an example embodiment" at various places in the specification does not necessarily refer to the same example embodiment. Note, nothing described or referenced in this document is admitted as prior art to this application unless explicitly so stated.

Figure 1A:
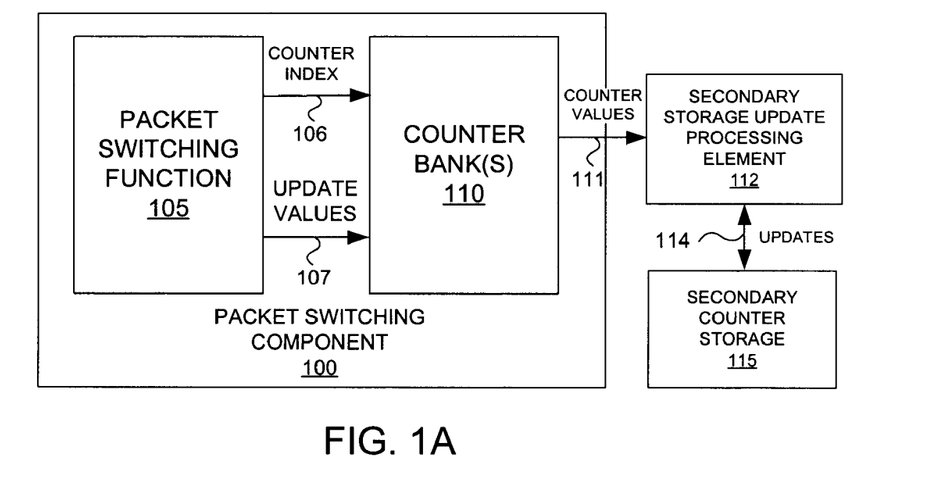
FIG. 1A illustrates an example of a packet switching component.

FIG. 1A illustrates an example packet switching component 100 including a packet switching function 105 and a counter bank 110. In one embodiment, the packet switching component is a chip, ASIC, board, or other entity. Also depicted in FIG. 1A is a secondary storage update processing element 112 and a secondary counter storage element 115 utilized to hold the counter values.

As shown, packet switching function 105 generates a counter identifier 106 and optionally a counter update value 107. Counter identifier 106 is used to determine which counter in a bank of counters is to be updated. In one embodiment, counter identifier 106 is an index to the counter bank (e.g., memory or other storage mechanism). Counter update value 107 (e.g., the number of packets, bytes, etc.) is optionally generated. In some contexts, the value to update the counter may be inferred from the particular counter being updated or it might always be the same (e.g., always update the counter by one or some other value).

The operation of the system depicted in FIG. 1A will now be described. Externally-visible counters typically must maintain total event counts that last for days, weeks, or even years. One frequent choice is to provide 64-bit externally-visible counters, effectively ensuring that they will never wrap. These counters are typically stored in the secondary storage element 115 which can be implemented as system RAM (usually DRAM or SDRAM). The corresponding counter that is implemented in hardware (the LSB (Least Significant Bits) counter included in the counter bank(s) 110) is usually much smaller than 64 bits because typical special-purpose counter resources in ASICs are more expensive and hence more limited than commodity system memory. In order to provide the external view of a large counter, the system software periodically reads each counter from the hardware device, adding the value read to an externally-visible counter that is stored in less-expensive system RAM.

The bit-width of the LSB counters is typically chosen such that, in the worst case, all counters can be visited before they overflow, where a particular rate at which the counters can be visited is assumed. The counter visitation rate is typically a system-dependent constant and is limited by the total fraction of CPU time (or bus bandwidth in some cases) that is allocated to reading counters. For example, in a device with 100,000 counters, if the CPU is limited to reading 10,000 counters per second then the counters must be sized such that they have capacity to handle 10 seconds worth of traffic. In some systems CPU performance may limit the rate at which the counters can be read, in others the limitation might be bus bandwidth.

With this approach, the width of an on-chip LSB counter is determined by the maximum interval between the exports of the count held in the on-chip LSB counter to DRAM. But since the number of counters maintained in the switch is normally quite large, total amount of on-chip counter memory is still quite large. So, often a significant percentage of chip area is used for statistics memory.

Figure 1B:
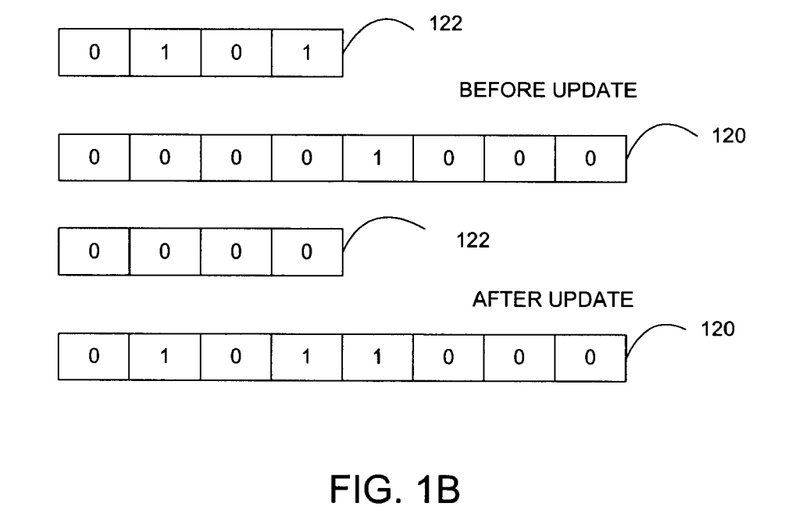
FIG. 1B illustrates an example of updating a visible counter.

FIG. 1B illustrates an example of an externally visible counter 120 maintained in the secondary storage and the LSB counter 122 maintained on the ASIC. For ease of explanation the LSB counter is a 4-bit counter and the externally visible counter is an 8-bit counter. The LSB counter overflows after the occurrence of 16 events that are counted. In the above example, the LSB counter has the capacity to handle only 10 seconds worth of events. If more than 16 events occur in 10 seconds then the LSB counter would overflow and the information would be lost.

When the LSB counter is visited its value is read and added to the value held in the externally visible counter. In this example, the LSB counter value is "0101" and the externally visible counter value is "00001000" before the LSB counter is visited. After the LSB counter is visited its value is cleared and the externally visible counter value is updated to "01011000".

An example of a bank-overflow-buffer (BOB) is disclosed in commonly assigned U.S. Pat. No. 7,391,721. An important property of many of the counters is that they are arranged into "banks". A "bank" of counters is typically defined as, but not limited to, a set of counters in which at most C counters in the set can be updated at one time, where C is typically an integer, and is often one or some other small integer. The value of C can be used in determining the sizes of the counters maintained in a bank and the overflow buffer, as well as determining the rate at which the secondary counters must be updated based on the counters maintained in a bank and the overflow indications added to the overflow buffer.

An assumption in a counter bank is that every update might apply to the same counter, and thus affect the rate at which it must be read before it overflows. For example, in one embodiment, counters are maintained for flows, and each flow has packet and byte counters associated with it. A flow's byte and packet counters are updated every time a packet in a flow is received and forwarded. The set of flow byte counters may form one bank and the set of packet counters may form another. These counters may be stored in a single counter memory.

In a typical counter bank implementation wherein C equals one, there is one counter per entry in the bank. If the entire counter bank can be scanned by a secondary storage update mechanism in time T, then the counters must be wide enough to ensure that no counter could possibly overflow in time T. This implementation (i.e., without an overflow buffer) is somewhat wasteful of bits, because at most one counter in a bank can overflow in time T. The vast majority of the counters will not be anywhere near overflowing. If one counter overflows in time T, then all other counters must have no packets. Generalizing, the critical observation is this: if a single counter in a bank can overflow in time T, then at most two counters can overflow in time 2T, at most four counters in time 4T, and in general at most N counters can overflow in time NT. By adding an overflow buffer, the total number of bits required in the counter bank can be significantly decreased without reducing the externally-perceived time that it takes the bank (or rather, some counter in the bank) to overflow.

An overflow buffer described in the above-referenced patent consists of a small, N-entry table associated with the memory. In one embodiment, the overflow buffer is a queue or circular buffer that stores the indices of the last N counters that overflowed.

When a counter update to a counter in a bank causes it to wrap, (the truncated) new counter value is written back to the counter bank as usual, the index of the overflowing entry is written into the overflow buffer, and the overflow buffer's "next" pointer is advanced (e.g., the index of the counter is enqueued into the overflow buffer). A secondary memory update mechanism is typically responsible for keeping track of which overflow buffer entries it has read and for visiting the overflow buffer fast enough to prevent unread entries from getting overwritten.

In operation, the entire bank is scanned in some period T, and all secondary counters are augmented by a value read from the corresponding hardware counter. Additionally, in that same interval T, the entire overflow buffer is also scanned, and for each new entry in the overflow buffer (i.e., the entries added since the last time the overflow buffer was scanned), the corresponding secondary counter is incremented by an amount equal to its overflow value. For example, if the counter is w bits wide, then the corresponding secondary counter is typically incremented by $2^w$.

It takes the secondary counter update mechanism time t to read one hardware counter and update the corresponding secondary counter. So an N-entry counter bank can be completely scanned in time t*N. Now, assume that a B-entry overflow buffer is added to the bank and that it takes time t to process one overflow buffer entry. In time t*(N+B), the entire counter bank and the overflow buffer can be scanned. The values of the hardware counters are only lost if the entire overflow buffer fills up before the secondary counter update mechanism scans it. This can only happen if more than B counters overflow in the time it takes to scan the entire bank and overflow buffer. Alternatively, if the scan interval for the bank and overflow buffer is T seconds, then the addition of a B-entry overflow buffer can reduce the counter memories in the bank by log 2 (B) bits without reducing the overflow time.

Each doubling in the size of the overflow buffer eliminates one more bit from the counter bank without increasing the scan time of the bank. Once the size of the overflow buffer exceeds some value (which can be derived from the bank size), the benefit accrued by shrinking the counter bank is typically offset by the increase in size of the overflow buffer. For example, if the bank has $2^n=N$ entries in it, then each doubling of the overflow buffer's size from B to 2B can eliminate N bits from the counter bank, but this typically requires the size of the overflow buffer to be increased by B*n bits.

A network flow is defined as a unidirectional stream of packets between a given source and destination—both defined by a network-layer IP address and transport-layer port number. Specifically, a flow is identified as the combination of the following fields: source IP address, destination IP address, source port number, destination port number, protocol type, type of service, and input or output interface.

In the case of flow statistics counters, the counters are part of a large set of flow states that are stored as a single entry in a table. Since the total number of possible entries is very large, it is impractical to keep an on-chip entry for each possible flow. However, the number of active flows is relatively small and an on-chip hash table can be used to store the active flow states. When a packet arrives, the switch hardware searches the hash table to find a matching flow-entry. If a matching entry is found, the state (including statistic counters) is updated. Otherwise a new flow-entry is created in the hash-table.

Accordingly, there are many flows with only a small number active at a given time. This fact is utilized to form a cache-like structure having a small on-chip Primary Flow-Counter Bank (PFCB) maintaining entries for the active flows and a complete Secondary Flow-Counter Bank (SFCB) maintained on off-chip system RAM.

When a packet is received an index is generated by a hash function from tuples included in the packet. This index is used to locate an entry in the hash table by doing a lookup in the PFCB. Because there are a finite number of entries servicing an unbounded number of flows the tuples of the different flows may hash to the same index and the same entry may at different times be assigned different flows.

Therefore, the flow information in the entry is compared to the flow information in the received packet to determine if there is a hit. If there is a hit then the counter value is updated. If there is a miss and no entry exists in PFCB then a new table entry is initialized and associated with the received packet. At the time when the new table entry is initialized there is no entry for the flow in SFCB. When SFCB is updated the information in the table entry for the new flow is transferred to a new entry created in SFCB.

Since there are a fixed number of entries in the PFCB and the number of flows is unbounded there must be a way to depopulate the table and retire flows. In this example embodiment an asynchronous hardware "search engine" utilizes selected criteria to remove flows from PFCB and to free up entries.

For example, the asynchronous search engine can transfer on-chip flow state to state maintained in system DRAM (or directly to a netflow device) by periodically scanning the hash table and finding flows that have been inactive for a long period, that have a flow-state showing connection termination or that meet other criteria, e.g. that have a counter value that is above threshold. When the hardwire search engine removes a flow from PFCB and frees up the entry holding information for the removed flow, there may still be a corresponding entry in SFCB. Subsequently the tuples of the first packet of a new flow may hash to the same index and the new flow will start reusing the same entry in PFCB, while information of the old flow still resides in the SFCB entry having the same index. In these cases the index of the SFCB entry is not synchronized with the index of the PFCB entry.

Because of this possible lack of synchronization, mapping of entries between PFCB and SFCB cannot be done solely based on index. Instead, the mapping is done based on flow information. When a counter value is sent from PFCB to SFCB, the flow identification information (source IP address, destination IP address, source port number, destination port number, protocol type, etc) is sent along with the counter value to assure that information for the correct flow is being updated.

As described above, in the standard bank overflow buffer when a counter overflows its index is stored in an entry of the bank overflow buffer. When the counter values are transferred to system RAM the entire bank overflow buffer must be read and the stored indices are used to adjust the count values of the indexed counters.

If the on-chip PFCB entry is released after transferring its state to off-chip secondary storage and the same flow-index is reused for another flow before the standard bank overflow buffer is read and summed with the counter values held in the PFCB entry then the standard bank overflow buffer might store an index that has been reused. In this case, the index stored in the standard bank overflow buffer would not correspond to the current counter assigned to the PFCB entry having that index.

First and second example embodiments will now be described that modify the standard bank overflow buffer to allow its use with Netflow statistics.

A first example embodiment will now be described with reference to the flow chart of FIG. 1C which illustrates the case where an PFCB address-1 entry is valid and the search engine is programmed to read and lock the PFCB address-1 entry. In this example embodiment each PFCB entry is set to the valid state if it holds flow information of an active flow, is set to the invalid state if it holds flow information of a retired flow, or is set to the lock state if it contains a flow whose information has been collected from the PFCB but has not yet been collected from the bank overflow structure. Invalid entries may be reused for new flows and a locked flow may not be used for new flows.

Figure 1C:
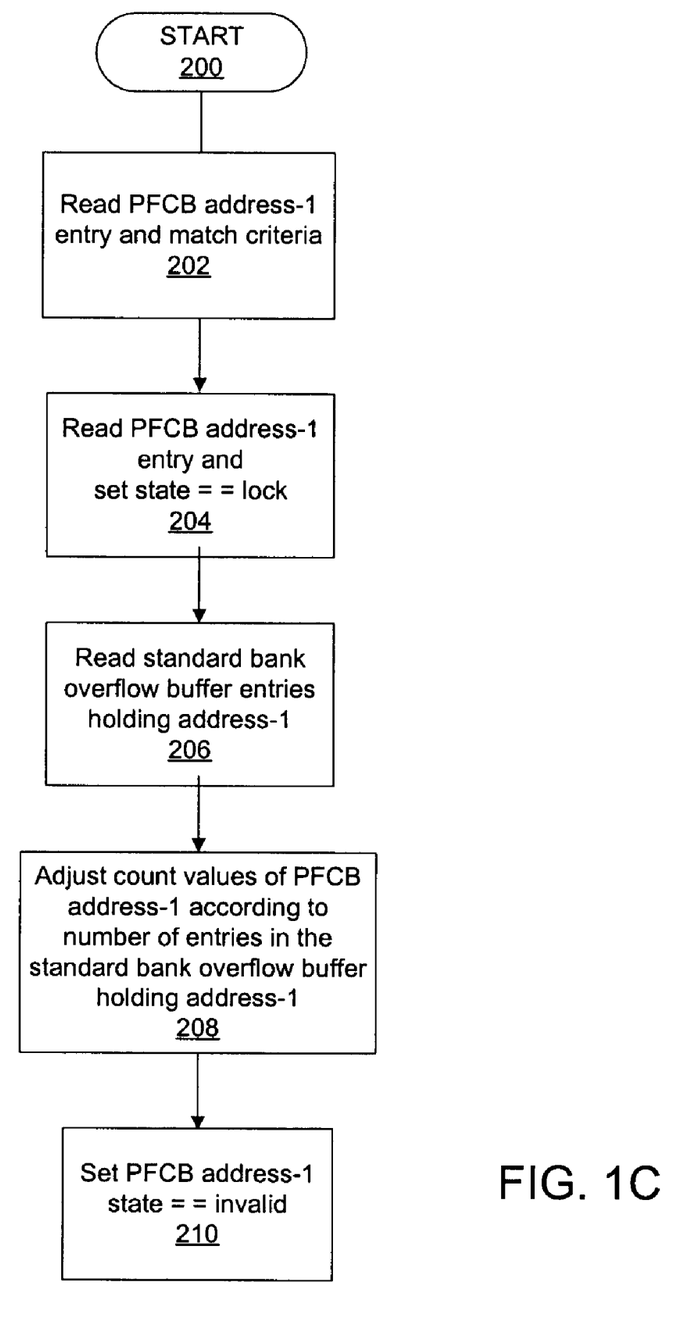
FIG. 1C illustrates a flow chart of a process for reading a PFCB entry.

In FIG. 1C, processing begins in process block 200. In process block 202 the PFCB address-1 entry is read and search criteria are matched to the contents of the entry and in process block 204 the PFCB address-1 entry is read and its state is set to lock.

In process block 206 the entries of the standard bank overflow buffer holding address-1 are read and in process block 208 the count values are adjusted according to the number of entries in the bank overflow buffer holding address-1. In process 210 the search engine sets the state of the PFCB address-1 entry to invalid.

By keeping the PFCB address-1 entry in the lock state while the counter values are read from PFCB address-1 and the count values are summed up, it is assured that the correct standard bank overflow information is applied to the correct flow.

This example embodiment requires that the search engine be able to lock the PFCB entry prior to invalidating it but does not require any modifications to the standard bank overflow buffer.

In a second example embodiment, the standard bank overflow buffer is modified so that each entry stores the flow identification information (source IP address, destination IP address, source port number, destination port number, protocol type, etc.) in addition to the index of the PFCB entry that overflows. In this case the bank overflow PFCB may be out of synch with the overflow buffer index but still functions correctly.

The secondary storage processing element 112 (FIG. 2) sums the counter values and verifies that the index held in the standard bank overflow buffer is synchronized with the PFCB entry by executing software to check the flow information held in the entry's bank overflow buffer. Alternatively, the counts may be exported to the netflow aggregator.

Figure 2:
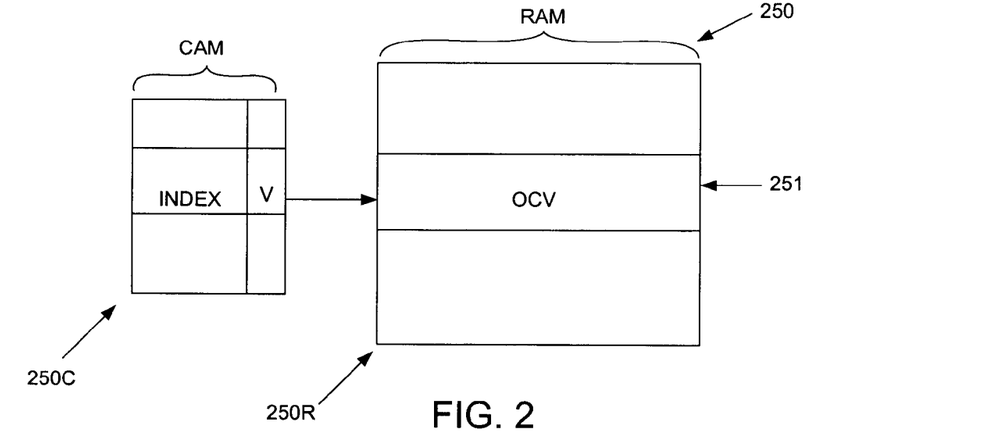
FIG. 2 illustrates an example of an overflow structure.

A third example embodiment utilizes a content addressable memory (CAM) overflow structure that is different than the standard bank overflow buffer. The logical structure of this CAM overflow structure 250 for use in conjunction with a PFCB is depicted in FIG. 2. Each entry 251 in the CAM overflow structure includes a counter index value, an overflow count value (OCV), which keeps track of the number of times a corresponding LSB-counter in the PFCB has overflowed, and a valid bit. An entry in the CAM overflow structure is populated when a corresponding counter in PFCB overflows, as will be described in more detail below.

In this example embodiment, an entry in a binary content addressable memory (CAM) 250C is utilized to store the index of the counter in the PFCB that overflowed and the valid bit. An entry of an on-chip or custom RAM 250R is associated with each entry of CAM and contains a b-bit wide overflow count value for a netflow counter in the PFCB. Every time a counter overflows, the corresponding overflow count value associated with the index is incremented. Since there are multiple packet/byte counters associated with each flow, the RAM width is c*b, where there are c counters for each flow.

Figure 3:
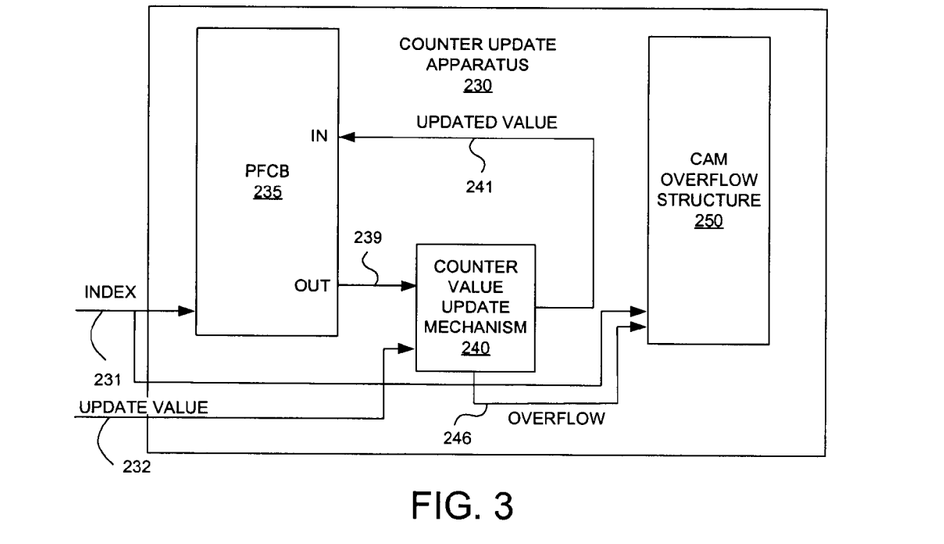
FIG. 3 illustrates an example of a counter update apparatus.

FIG. 3 illustrates an example block diagram of a portion of a counter update apparatus 230 used to maintain values of counters in PFCB 235 (e.g., a memory, set of hardware counters, etc.), and to update the CAM overflow structure 250 in response to an overflow condition generated during such an update of a counter value. An index 231 of a counter to be updated is received as well as an update value 232 (which in one embodiment is a constant value of one or some other value while in another embodiment it may vary). Counter value update mechanism 240 receives the current value 239 of the counter from PFCB 235 and generates updated value 241 based on update value 232 and current value 239. Updated value 241 is then stored in PFCB 235 as the new value for the counter. If an overflow condition is generated as indicated by signal 246, then the overflow count value of a corresponding entry in the CAM overflow structure 250 is incremented.

Figure 4:
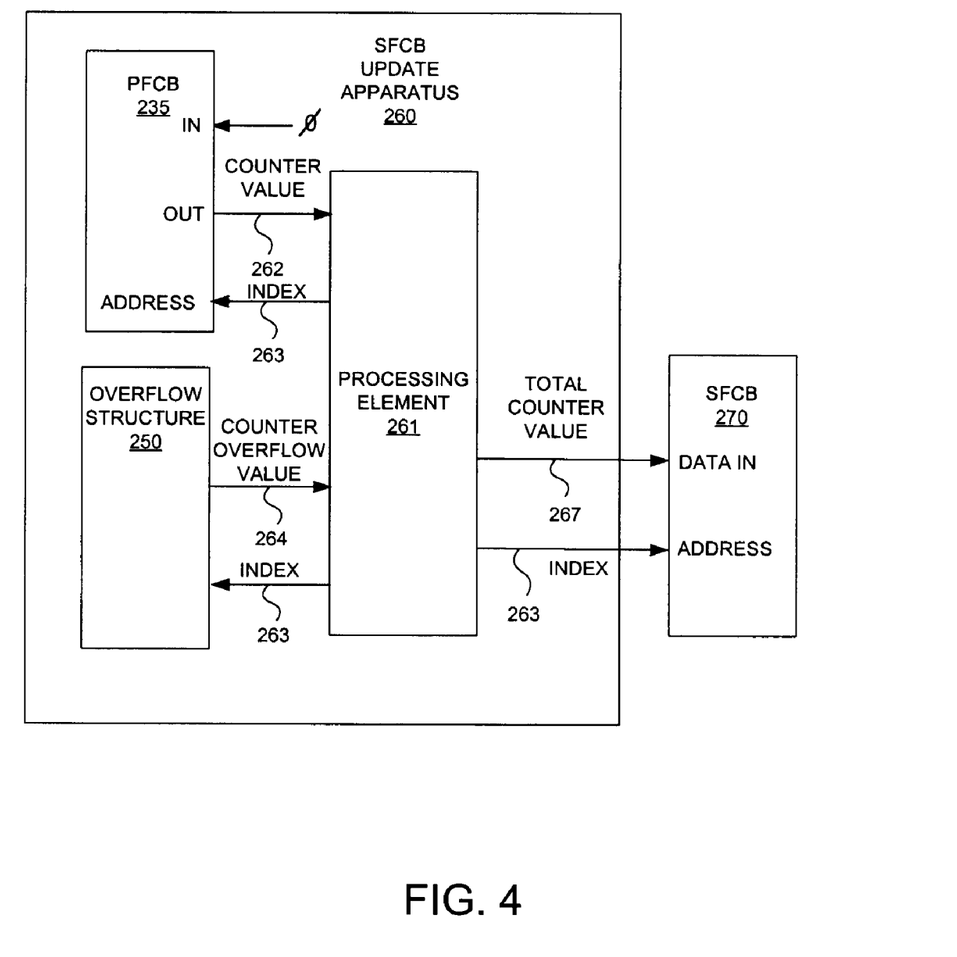
FIG. 4 illustrates an example of an SFCB entry update apparatus.

FIG. 4 illustrates an example block diagram of an SFCB update apparatus 260 used in one embodiment to update the SFCB 270 held in secondary storage with current snapshot values of the counters. The current value of a particular counter is its corresponding value stored in PFCB 235 plus an overflow adjustment if there are any corresponding entries in CAM overflow structure 250 (i.e., an adjustment amount based on the overflow count value held in the corresponding entry of the CAM overflow structure 250).

Processing element 261 sequences through multiple counters stored in PFCB 235 to retrieve and reset the current value of counters, selected according to a search criteria, to an initial value (e.g., typically zero or some other constant) and to update the corresponding counter values maintained in SFCB 270. For example, in one embodiment, processing element 261 will provide a counter index address 263 to PFCB 235 to receive counter value 262 and then to reset the counter's value to zero (e.g., either by writing a zero or by using a reset-on-read memory for counters in PFCB 235).

When a PFCB entry is visited the index 263 is used to search valid entries in the CAM of the CAM overflow structure 250 for a match to the same index. If there is a match, then the overflow count value in the corresponding entry of the CAM overflow structure 250 is output to the processing element 261 and is concatenated with the counter value from the PFCB to form the total count value 267 which is exported to SFCB 270.

Figure 5:
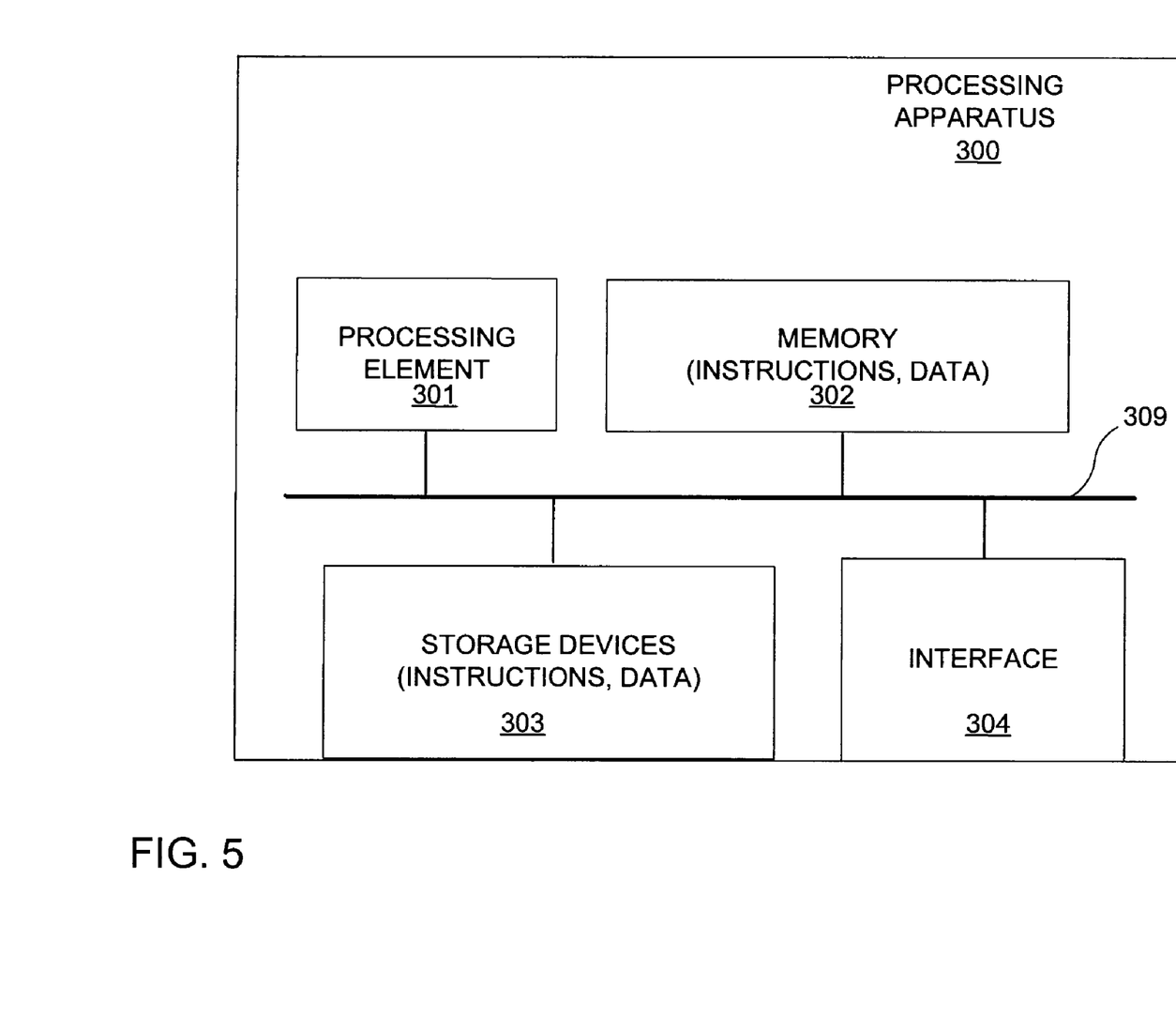
FIG. 5 illustrates an example of a processing apparatus.

FIG. 5 is a block diagram of a processing apparatus 300 that can be utilized as a counter update apparatus 230 (see FIG. 3) in one embodiment for maintaining counters in the PFCB or as an SFCB updating apparatus 260 (see FIG. 4) for updating the SFCB based on values of the counters and entries in an overflow structure, such as in, but not limited to, a packet switching system. In one embodiment, processing apparatus 300 performs one or more processes corresponding to one or more of the flow diagrams illustrated or otherwise described herein.

In one embodiment, the processing apparatus 300 includes a processing element 301, memory 302, storage devices 303 and interface 304 for receiving counter update requests and for communicating stored counter values with other entities and for sending and receiving information/data items and/or communicating with external devices (e.g. processors, packet processors, computers, etc.), which are typically coupled via one or more communications mechanisms 309, with the communications paths typically tailored to meet the needs of the application. Various embodiments of the processing apparatus 300 may include more or less elements. The operation of the processing apparatus 300 is typically controlled by processing element 301 using memory 302 and storage devices 303 to perform one or more tasks or processes. Memory 302 is one type of computer-readable medium, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with an embodiment. Storage devices 303 are another type of computer-readable medium, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with an embodiment.

The processing apparatus can alternatively be formed partially or completely by hard-wired logic for rapidly implementing certain functions such as the asynchronous search engine.

Figure 6A:
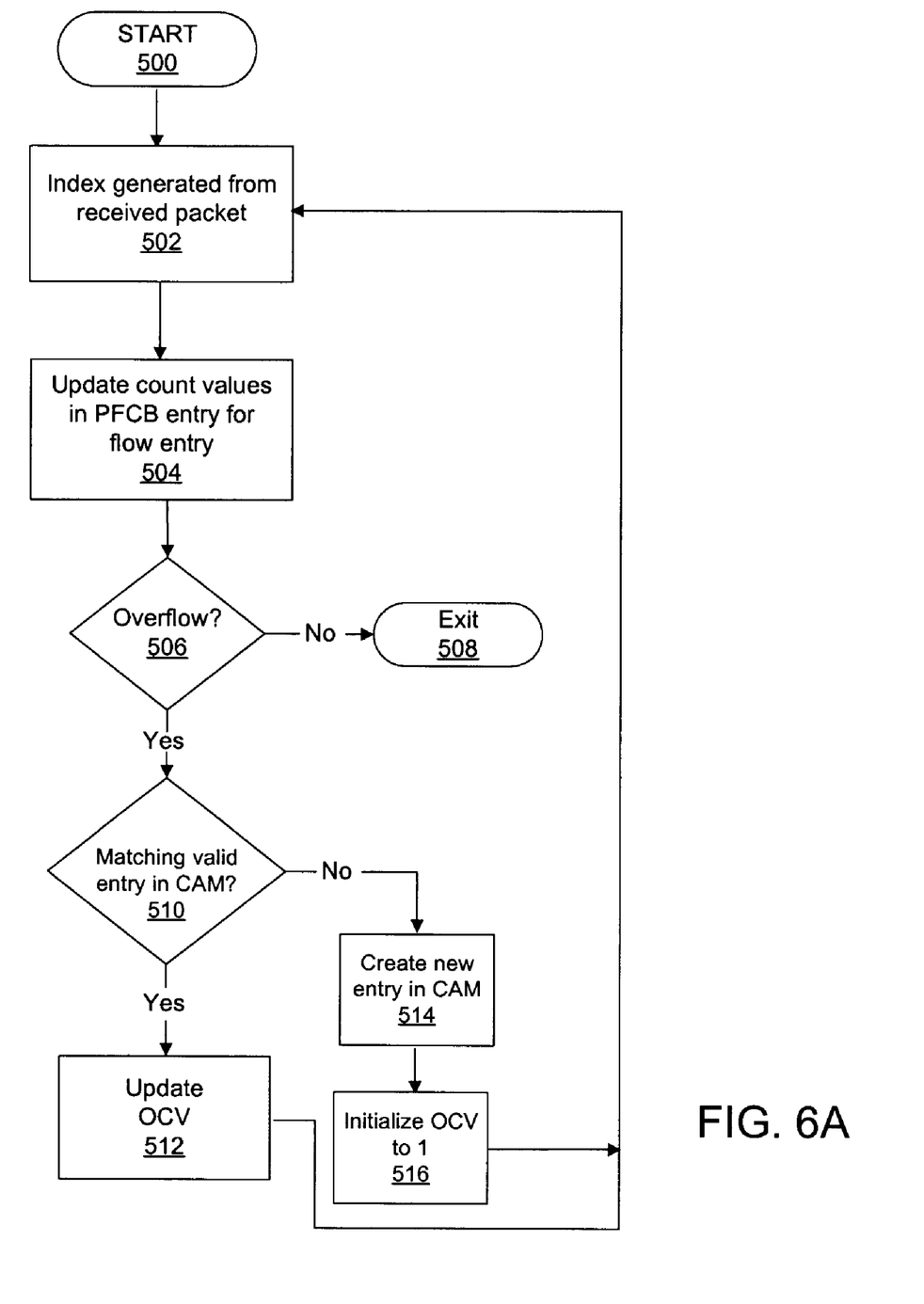
FIG. 6A illustrates an example flow chart of a process for updating a counter in the PFCB.

FIG. 6A illustrates a process, used in an example embodiment, for updating an LSB counter in a counter bank of the PFCB and updating the overflow count value in the corresponding entry of the overflow structure when a new packet arrives and an overflow occurs. Processing begins with process block 500, and proceeds to process block 502, wherein an index is generated from the tuples in a received packet.

This index is used to locate an entry in PFCB and the flow information in the located entry is examined to determine whether there is a hit. If there is a hit then in process block 504 the counter value in the LSB counter is updated.

Each overflow structure entry includes an index and an overflow count value, where the overflow count value keeps track of the number of times a corresponding LSB counter has overflowed. In process block 506 it is determined if the LSB counter overflows. If not, then in process block 508 the procedure exits. If there is an overflow then in process block 510 the on-chip hardware searches for a valid entry in the overflow structure having the same index associated with the LSB counter that overflowed.

In process block 512, if a matching entry is found, the overflow count value in the overflow structure entry having the same index is incremented. If no matching entry is found, in process block 514 a new entry is created in overflow structure with the same index assigned to the LSB counter and the value "1" is written to the overflow count value in the new overflow structure entry. Since the overflow count value indicates the number of times the LSB counter overflows, the overflow count value effectively stores the middle-bits (bits above the LSB bits in PFCB) of the counter. Processing returns to process block 502 to update more counters.

Figure 6B:
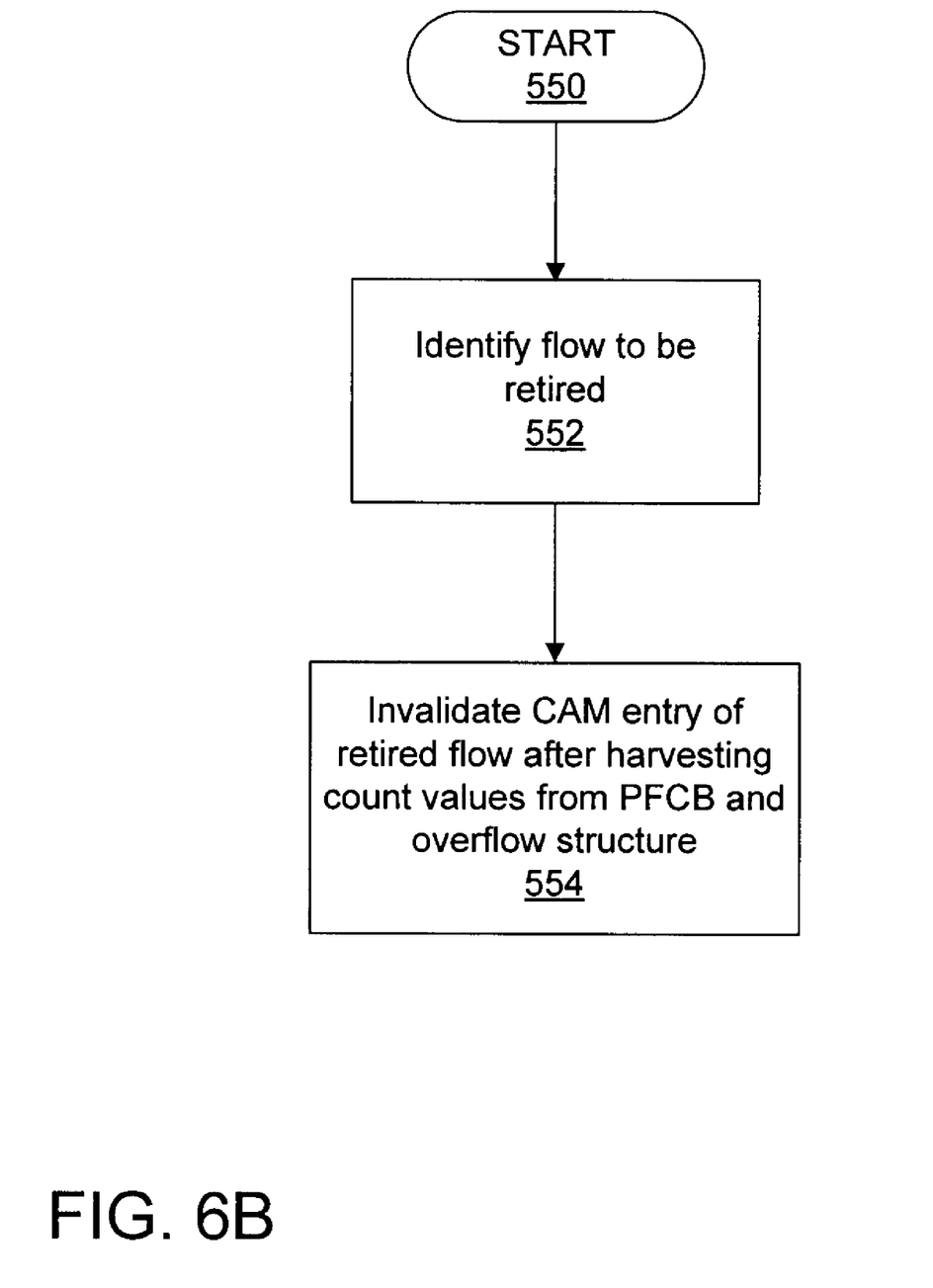
FIG. 6B illustrates an example flow chart of a process for invalidating an entry in the PFCB.

FIG. 6B illustrates a process, used in an example embodiment, for freeing up an entry in PFCB and the overflow structure. Processing begins with process block 550, and proceeds to process block 552 wherein the asynchronous search engine identifies the flow to be retired. In process block 554 the valid bit in the CAM entry holding the index of the flow being retired is reset to indicate that the index is invalid and the CAM entry is free after the count values from both the PFCB and the overflow structure are harvested.

This process assures that the information held in the CAM does not relate to the wrong flow.

Figure 7:
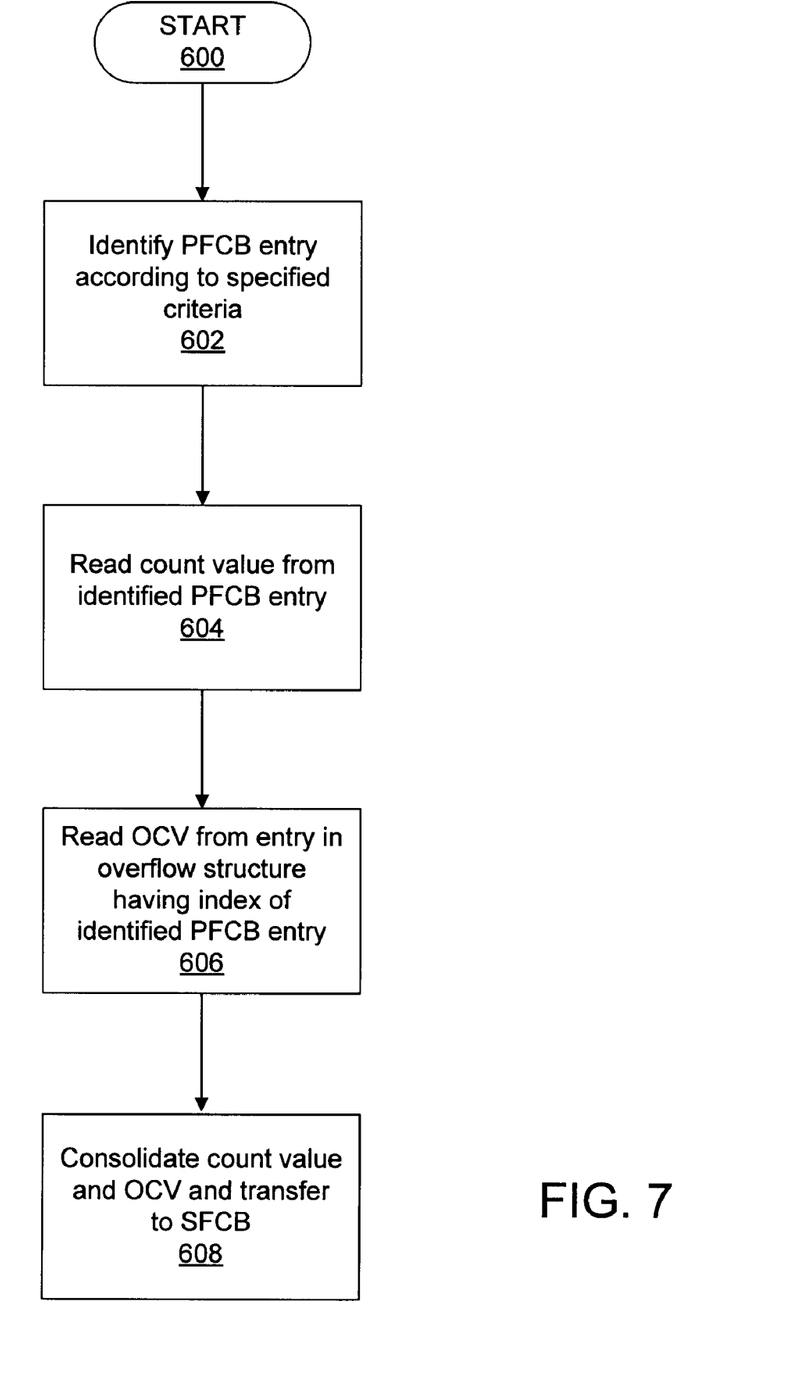
FIG. 7 illustrates an example flow chart of a process for updating an SFCB entry.

FIG. 7 illustrates a process, used in an example embodiment, for updating counters in the SFCB. Processing begins in process block 600, and proceeds to process block 602, wherein a PFCB entry is identified by the asynchronous search engine according to selected criteria. In process block 604 the count value is read from the identified PFCB entry and in process block 606 the OCV identified by the index of the identified PFCB entry is read from the overflow structure. In processing block 608 the count value and OCV are consolidated and transferred to the SFCB entry of the identified flow.

The CAM overflow structure does not require extra bandwidth, storage capacity or CPU processing time to transfer and store flow information in the overflow structure. Additionally, transferring flow information to the SFCB for flows matching specific criteria is simplified. In the standard bank overflow buffer once an index of a matched flow is determined all entries of the standard bank overflow buffer must be read to determine whether they hold a matching entry in order to correctly adjust the count value. In contrast, in the CAM overflow structure all overflow information is held in a single OCV accessed through the index held in the CAM.

Figure 8:
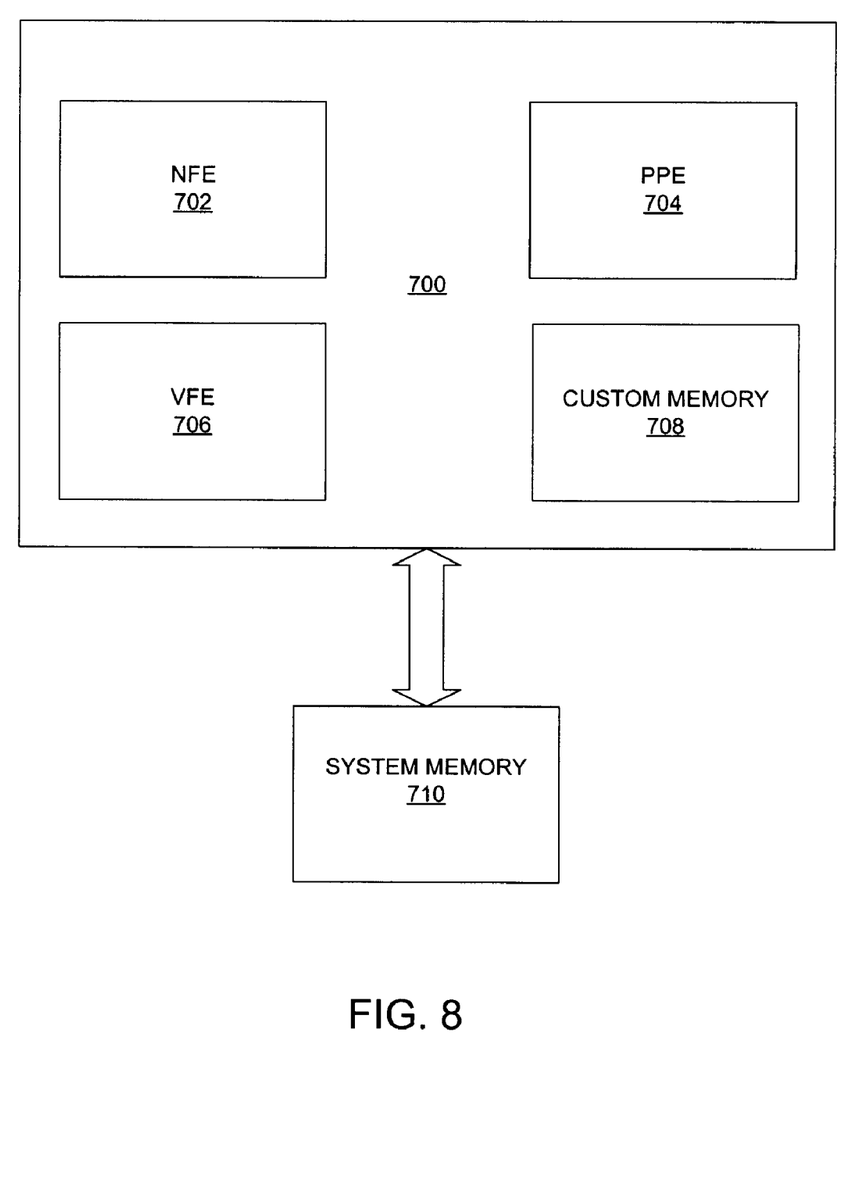
FIG. 8 illustrates an example of an ASIC chip set for implementing an example embodiment.

FIG. 8 depicts an example of a hardware system for implementing example embodiments. In FIG. 8 an ASIC chip set and a constellation of external memories together implement IP routing and Ethernet bridging in hardware. The ASIC chip set 700, in this example, includes a Netflow Engine (NFE) 702, a Packet Processing Engine (PPE) 704, Very-fast forwarding Engine (VFE) 706 and custom memory 708. System memory 710 may be implemented utilizing non-custom DRAM.

In this example embodiment, the PFCB utilizes the custom memory 708, the overflow structure resides in the NFE 702 and the SFCB resides in the non-custom system memory 710. In an example embodiment counters in PFCB are Stop At Max, Clear On Read (SAMCOR) counters.

Various example embodiments have been described above. Alternatives and substitutions will now be apparent to persons of skill in the art. Accordingly, it is not intended to limit the invention except as provided by the appended claims.

What is claimed is:

1. A method comprising:
   updating a current value of a counter held in a first entry of a primary flow-counter bank (PFCB) when a packet in a first netflow is received, with the first entry indexed by a first index hashed from tuples in packets of the first netflow, with the PFCB maintained on a netflow processing logic block, with each entry in the PFCB associated with a netflow, with each entry in the PFCB having an index hashed from tuples in packets of an associated flow, and with each entry in the PFCB holding information identifying the associated netflow;
   searching a content addressable memory (CAM) when the current value overflows, with CAM entries holding a set of valid indices, to determine if the first index is included in the set of valid indices, where each CAM entry is associated with an overflow count value (OCV) entry in a custom memory that holds an OCV;
   incrementing a first OCV by an incremental value if the first index is a valid index held in a first CAM entry, where the first OCV is held in a first OCV entry associated with the first CAM entry holding the first index;
   consolidating the first OCV and the current value to form a total count value when the current value of the first counter is to be transferred to secondary storage; and
   transferring the total count value to an entry in secondary storage corresponding to the first netflow.

2. The method of claim 1 further comprising:
   clearing the first entry of the PFCB subsequent to transferring the total count value.

3. The method of claim 1 further comprising:
   invalidating a valid index held in a CAM entry when the entry in the PFCB corresponding to the valid index is invalidated and after the CAM entry has been read.

4. The method of claim 3 further comprising:
   writing the first index to an open or invalid CAM entry if the current value overflows and the first index is not included in the set of valid indices stored in the CAM; and
   initializing the counter overflow value to the incremental value.

5. The method of claim 3 with invalidating the valid index comprising:
   resetting a valid bit held in the first CAM entry.

6. The method of claim 3 where the incremental value is equal to one.

7. An apparatus comprising:
   a primary flow-counter bank (PFCB) having a plurality of entries, each entry configured to hold a counter value associated with a netflow, with the PFCB maintained on a flow processing logic block including custom memory and with each entry in the PFCB addressed by an index derived from the tuples of a packet in a corresponding flow; and a CAM overflow structure including a content addressable memory (CAM) having a like plurality of CAM entries holding indices derived from packets in a set of flows and including overflow count value (OCV) entries of custom memory, with one OCV entry associated with each CAM entry, and with OCV entries configured to hold an OCV that is incremented by an incremental value when a counter value associated with the index held in the associated CAM entry overflows.

8. The apparatus of claim 7 further comprising:
a secondary flow-counter bank (SFCB) having entries for every flow processed by a network device, with the SFCB maintained on system memory; and
a processing element configured to periodically scan the PFCB and CAM overflow structure, to consolidate the OCV scanned from the CAM overflow structure and the counter value scanned from the PFCB to form a total count value, and to transfer the total count value to a corresponding entry in the SFCB.

9. The apparatus of claim 7 where:
entries in the PFCB are further configured to hold a valid bit which is reset when a flow associated with the entry is retired; and
CAM entries are further configured to hold a valid bit which is reset when a flow associated with the CAM entry is retired.

10. The apparatus of claim 7 where:
entries in the PFCB are further configured to be cleared when a counter value is read from the entry.

11. The apparatus of claim 8 further comprising:
logic configured to search the PFCB for entries matching a specified criteria to be transferred to the SFCB.

12. An apparatus comprising:
means for updating a current value of a counter held in a first entry of a primary flow-counter bank (PFCB) when a packet in a first netflow is received, with the first entry indexed by a first index hashed from tuples in packets of the first netflow, with the PFCB maintained on a netflow processing logic block, with each entry in the PFCB associated with a netflow, with each entry in the PFCB having an index hashed from tuples in packets of an associated flow, and with each entry in the PFCB holding information identifying the associated netflow;
means for searching a content addressable memory (CAM) when the current value overflows, with CAM entries holding a set of valid indices, to determine if the first index is included in the set of valid indices, where each CAM entry is associated with an overflow count value (OCV) entry in a custom memory that holds an OCV;
means for incrementing a first OCV by an incremental value if the first index is a valid index held in a first CAM entry, where the first OCV is held in a first OCV entry associated with the first CAM entry holding the first index;

means for consolidating the first OCV and the current value to form a total count value when the current value of the first counter is to be transferred to secondary storage; and
means for transferring the total count value to an entry in secondary storage corresponding to the first netflow.

13. The apparatus of claim 12 further comprising:
means for clearing the first entry of the PFCB subsequent to transferring the total count value.

14. The apparatus of claim 12 further comprising:
means for invalidating a valid index held in a CAM entry when the entry in the PFCB corresponding to the valid index is invalidated and the current value and after the CAM entry has been read.

15. The apparatus of claim 14 further comprising:
means for writing the first index to an open or invalid CAM entry if the current value overflows and the first index is not included in the set of valid indices stored in the CAM; and
means for initializing the counter overflow value to the incremental value.

16. The apparatus of claim 14 with means for invalidating the valid index comprising:
means for resetting a valid bit held in the first CAM entry.

17. The apparatus of claim 12 where the incremental value is equal to one.

18. An apparatus comprising:
a primary flow-counter bank (PFCB) having a plurality of entries, each entry configured to hold a counter value associated with a netflow, with the PFCB maintained on a flow processing logic block including custom memory and with each entry in the PFCB indicated by an index derived from the tuples of a packet in a corresponding flow;
a bank overflow buffer (BOB) including a plurality of BOB entries, with the BOB entries configured to receive and store an index of an entry in the PFCB holding a counter value that overflows; and
a processing apparatus configured to update a current counter value held in a first entry of the PFCB when a packet in a first netflow is received, with the first counter indexed by a first index hashed from tuples of the first netflow, to store the first index in a BOB entry each time the first counter overflows, to read the current counter value held in the first entry of the PFCB, to lock the first entry of the PFCB subsequent to reading the current counter value, to read all BOB entries, to adjust the current counter value by the number of BOB entries holding the first index to form a total count value, and to transfer the total count value to an entry in secondary storage corresponding to the first netflow.

19. The apparatus of claim 18 with the processing apparatus further comprising:
logic configured to search the PFCB for entries matching a specified criteria to be transferred to secondary storage.

20. The apparatus of claim 18 where:
each entry in the PFCB is further configured to hold a valid bit which is reset when a flow associated with the entry is retired.

* * * * *